United States Patent [19]

Eiberger

[11] Patent Number: 4,920,461
[45] Date of Patent: Apr. 24, 1990

[54] BROADBAND MAGNETIC TAPE RECORDING WITH COMPENSATION FOR BANDWIDTH CHANGES RELATED TO DATA RATE

[75] Inventor: Berthold Eiberger, Darmstadt, Fed. Rep. of Germany

[73] Assignee: BTS Broadcast Television Systems GmbH, Darmstadt, Fed. Rep. of Germany

[21] Appl. No.: 296,521

[22] Filed: Jan. 12, 1989

[30] Foreign Application Priority Data

Jan. 14, 1988 [DE] Fed. Rep. of Germany ....... 3800827

[51] Int. Cl.⁵ ........................... G11B 5/02; G11B 5/14
[52] U.S. Cl. ......................................... 360/68; 360/64
[58] Field of Search .................... 360/64, 68, 108, 65, 360/67

[56] References Cited

U.S. PATENT DOCUMENTS

| | | | |
|---|---|---|---|
| 4,371,901 | 2/1983 | Shah | 360/65 |
| 4,656,533 | 4/1987 | Sakai et al. | 360/65 |
| 4,722,010 | 1/1988 | Suzuki et al. | 360/65 |
| 4,805,047 | 2/1989 | Nasu et al. | 360/65 |

*Primary Examiner*—Vincent P. Canney
*Attorney, Agent, or Firm*—Frishauf, Holtz, Goodman & Woodward

[57] ABSTRACT

When the relative speed of the head wheel to the tape transport is reduced for recording at a lower data rate, a resistance interposed between the stationary driver amplifier and the stator of a rotary transformer is reduced to produce a mismatch of the coupling between the driver amplifier and a recording amplifier on the head wheel. The latter is connected to the recording head. The mismatch lowers the upper cut-off frequency of transmission through the rotary transformer and shifts the frequency transmission band downward also lowering the lower cut-off frequency. A servo control which sets the relative speed of the head wheel circumference with reference to the moving tape provides a signal to a logic circuit which progressively switches in shunting resistors lowering the resistance interposed between the driver amplifier and the transformer stator, as the relative speed of rotary recording head to tape is reduced, for advantageous operation when the data rate is below the maximum data rate that can be used with the equipment. With a balanced circuit of the driver amplifier, an interposed resistance is connected on each side of the transformer stator and each of them is progressively shunted down by switching steps as the relative speed is reduced. At the highest relative speed, the output of the driver amplifier is matched to the input of the recording amplifier for good power transfer.

4 Claims, 2 Drawing Sheets

BROADBAND MAGNETIC TAPE RECORDING WITH COMPENSATION FOR BANDWIDTH CHANGES RELATED TO DATA RATE

This invention concerns a method and apparatus for recording broadband signals on magnetic tape, particularly in a recording and reproducing apparatus for digital signals, utilizing magnetic heads on a rotary head wheel in which the driving amplifiers for magnetic recording heads are coupled to rotary transformers with stationary amplifiers. More particularly, the invention concerns method and apparatus for improving the transmission between the stationary and rotary amplifiers on the recording side of a recording and reproducing equipment which is equipped for operating at different data rates.

Apparatus for recording and reproducing video signals is known from European Patent Document A2-110 680 which discloses the provision of various electrical component groups on a rotary drum. These electrical component groups are connected with other stationary electrical component groups through rotary transformers.

In recording and reproducing apparatus for analog video signals, the desired or design frequency transmission range of the rotary transformers which operate as a kind of bandpass filter is prescribed by the frequency bandwidth of the frequency modulated video signals. In recording and reproducing digital data signals, the frequency transmission range of these bandpass-like rotary transformers is not fixed, because in such equipment, measures are taken to change the data rate. The data rate should for example be variable over a 1:8 range by a reduction of the data rate from a specified maximum data rate.

If it is assumed that the ratio of the upper to lower cut-off frequencies of the bandpass-like rotary transformer lies in order of magnitude of 60, then the above-mentioned range of data rate will change, namely a maximum range of 1:8, results in a ratio of the upper to lower cut-off frequency of $60 \times 8 = 480$. With an assumed or specified maximum data rate of 100 Mbits/s, the rotary transformer would still be able to transmit about 200 kbit/s. Rotary transformer of that broad bandwidth are not readily producible by contemporary manufacturing technology because of the coupling and stray inductances.

SUMMARY OF THE INVENTION

It is an object of the present invention to provide a method and a circuit configuration for transmitting signals under the above-described conditions to a rotary magnetic recording head in which the rotary transformers are able to transmit signals of a frequency bandwidth which is changed in a manner corresponding to the data rate.

Briefly, when the frequency bandwidth of the signals is changed, the circuit coupling a stationary amplifier to a rotary transformer is modified to change the impedance matching through the rotary transformer. The invention has the advantage that in operation at a high data rate, the rotary transformers can be driven with matching to the load for best power transfer, whereas when the signals are provided at lower data rates, the upper cut-off frequency can be lowered for the benefit of the lower cut-off by means of an intentional mismatch, i.e. the transmission range of the rotary transformer is shifted. In this manner, the rotary transformer can be utilized over a bandwidth ratio of as much as 100 ($\leq 100$).

Implentation of the invention advantageously makes use of reducing the effective generator internal resistance and/or the termination resistances of the electrical component groups. Further details regarding implementation and particularly regarding respective unsymmetrical and symmetrical driving of the final recording amplifier will be better understood in connection with a detailed description that follows.

BRIEF DESCRIPTION OF THE DRAWING

The invention is further described by way of illustrated example with reference to the annexed drawings, in which:

FIG. 1 shows the final recording amplifier 10 providing an output for recording head 9 mounted on a rotary body 1 rotating in the direction of the arrow 2. The rotary body 1 can be a rotating head wheel such as is used for oblique track recording on magnetic tape. This is indicated by the diagram of the rotary body 1 which is a head wheel to a large extent enveloped by a moving magnetic tape 3, which is guided in its movement in the direction 4 to guide rollers 5 and 6. The advance of the magnetic tape 3 is produced by a drive shaft or capstan 7 cooperating with a rubber pressure roller 8.

Figure 1:
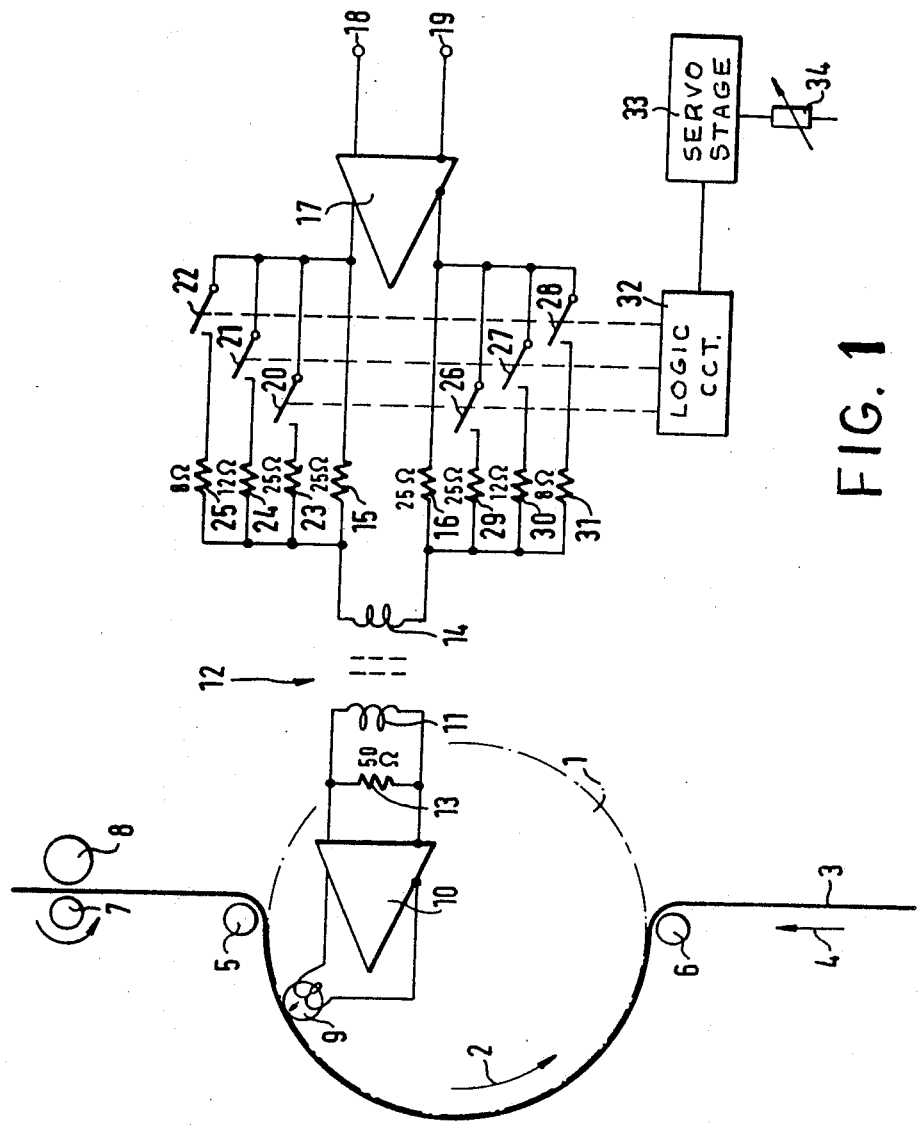
FIG. 1 is a diagram of a circuit configuration for symmetrical drive of a final recording amplifier through a rotary transformer in accordance with the invention.

Magnetic heads are affixed to the head wheel 1. In order to simplify the drawing, however, only a single magnetic head for recording of data signal is illustrated in FIG. 1. The magnetic head 9 is operated by the output of the recording amplifier 10 which is, as already mentioned, provided on the rotary head wheel 1. The input of the recording amplifier 10 is connected with the rotor winding 11 of a rotary transformer 12. The input of the recording amplifier 10 is shunted by resistance 13 which is a load resistance or terminating resistance for input signals. The rotor winding 11 and the load resistance 13, like the recording amplifier 10 and the magnetic head 9 are located on the rotary head wheel 1.

The inductive transmission of the signal, for example a data signal, through the rotor winding 11 is produced by means of the stationary stator winding 14 of the rotary transformer 12. The stator winding 14 of the rotary transformer 12 is connected over resistances 15 and 16 to symmetrical outputs of a driver amplifier 17 having symmetrical inputs connected to terminals 18 and 19. In parallel to the resistance 15, additional resistances 23, 24 and 25 are connected through controllable switches 20, 21 and 22. In a similar way, in parallel to the resistance 16, resistances 29, 30 and 31 are respectively connected through controlled switches 26, 27 and 28.

For control of the controllable switches 20-22 and 26-28, a logic circuit 32 is provided which is connected with a servo stage 33. The servo stage 33 regulates and controls the speeds of revolution of the head wheel 1 and of the drive shaft or capstan 17. In that way, the so-called relative velocity is determined which is obtainable by a vectorial addition of the tape transport speed with the peripheral speed of the rotating head wheel 1. The control or adjustment means 34 shown in FIG. 1 makes possible the selection of a particular relative velocity.

For large relative velocities and the high data rates then used, for example 48 m/s with 100 Mbits/s, the rotary transformer 12 will be driven for transmission of the data signal therethrough while matched to a load. For that purpose the controlled switches 20–22 and 26–28 are all open, so that only the output resistances 15 and 16 between the driver amplifier 17 and the stator winding 14 of the transformer are connected in the circuit. In a 50-ohm transmission line system the value of the terminating or load resistance 13 is 50 ohms and the value of the output resistances 15 and 16 are each 25 ohms.

If now the relative velocity is lower, according to the invention the resistances 23–25 and 29–31 are, in a selective manner, described below, connected in parallel with the output resistances 15 and 16 in accordance with the shift of the frequency bandwidth (frequency transformation) of the data signal to be transmitted inherent in the lowering of the relative velocity. With the resistance values given in FIG. 1, the impedance of the driving source (driver amplifier 17) can be modified by corresponding control of the logic circuit 32 between the value of 50 ohms and a value of 3 ohms.

The invention is based on the recognition that the lower cut-off frequency $f_1$ can be expressed according to the formula $$f_1 = \frac{R_i \cdot h^2 \cdot R_a}{2\pi \cdot L_{p1} (R_i + h^2 \cdot R_a)}$$

wherein $R_i$ is the sum of the two output resistance 15 and 16 which represents the internal resistance of the driver stage regarded as a generator, $L_{p1}$ is the coupling inductance and h is the transformation ratio between the two windings of the rotary transformer 12. For the upper cut-off frequency $f_u$ the relation holds $$f_u = \frac{R_i + h^2 \cdot R_a}{2\pi \cdot L\sigma}$$

wherein $L\sigma$ represents the stray inductance. The two expressions set forth above hold for loss-free and capacitance-free rotary transformers. For given values of the coupling and stray inductances as well as for the transformation ratio, the output resistance of the driver amplifier 17 and the matching resistance 13 determine the lower and upper cut-off frequencies of the transmission system formed by the rotary transformer.

In the illustrative embodiment of FIG. 1, only the values of the output resistances 15 and 16 are reduced by resistances switched in in parallel, while the value of the terminating resistance 13 is held constant. This was done merely in view of practical considerations in order to avoid the greater expense of corresponding variation of the matching resistance 13 on the rotary head wheel 1.

Figure 2:
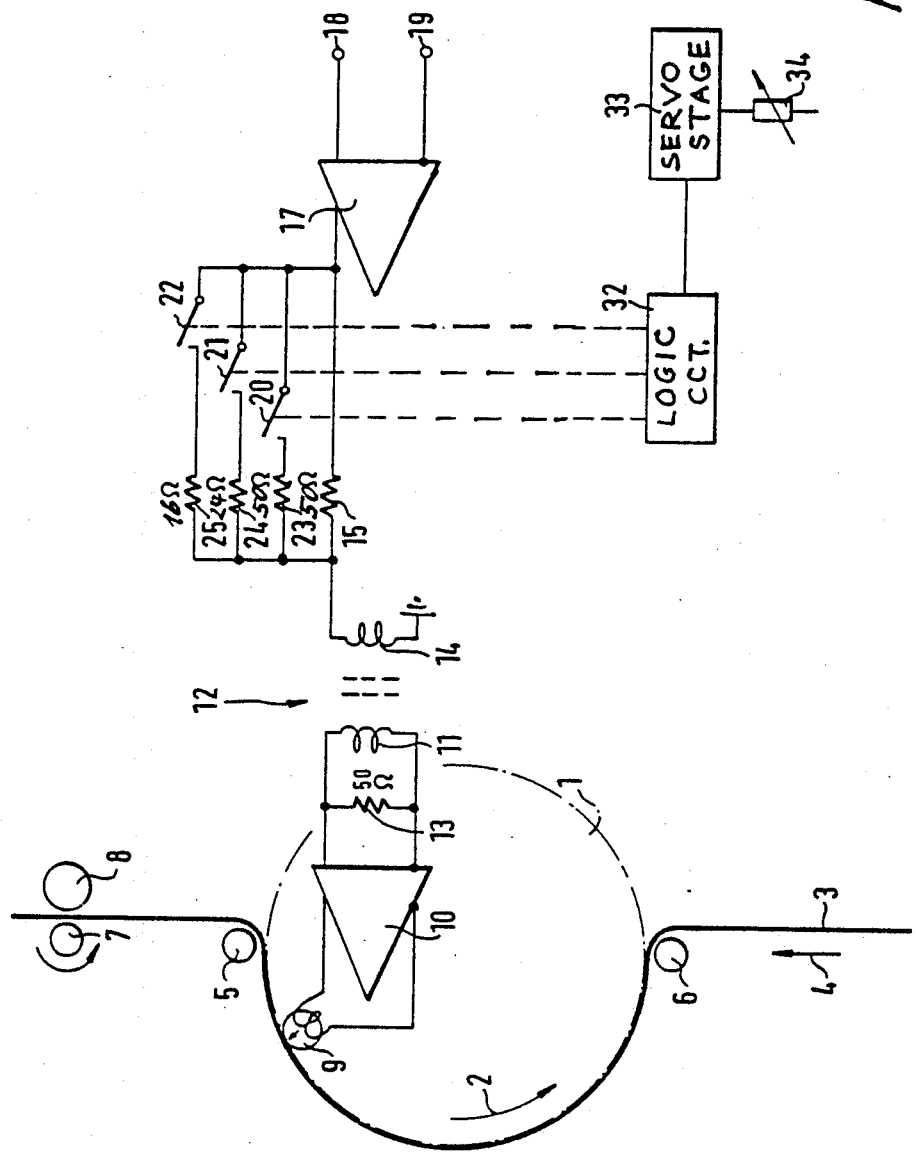
FIG. 2 is a circuit configuration diagram of the apparatus according to the invention for unsymmetrical drive of a final recording amplifier through a rotary transformer in accordance with the invention.

The switches 20 to 22 and 26 to 28 are shown in FIG. 1 as mechanical switches. In the scope of the invention, it is also possible, of course, to utilize other types of switches, for example electronic switches in the form of transistors. Similarly, the mismatching can be provided in course over fine stages as in the illustrated case. Furthermore, the driver amplifier 17 can also operate unsymmetrically, in which case one branch of the output resistances is omitted while the values of the remaining output resistances are to be doubled. This is illustrated in FIG. 2 which in view of the above remarks is self-explanatory.

Although the invention has been described with reference to particular illustrative embodiments, it will be recognized that modifications and variations are possible within the inventive concept.

I claim:

1. Method for transmitting signals from stationary circuits including a driver amplifier connected to a recording amplifier and a magnetic head on a rotary body of a magnetic recording device for broadband signals through a rotary transformer having a predetermined transmission frequency range, a first group of electrical components mounted on said rotary device being associated with said recording amplifier being connected to a rotor winding of said rotary transformer and a second group of electrical components being associated with said driver amplifier and being connected to the stator of said rotary transformer, comprising the steps of:

performing magnetic recording on said head and amplifier at a maximum relative speed of said recording head with respect to tape on which recording is performed with a driver series resistance provided by said second electric component group for said driver amplifier and an input terminating resistance provided by said first electric component group for said recording amplifer which resistances provide at least an approximate impedance match across said rotary transformer, and performing recording at lower relative speeds of said recording head with respect to tape on which recording is performed with changes of either said driver series resistance or said input terminating resistance or of both said driver series resistance and said input terminating resistance to produce a mismatch lowering the upper cut-off frequency of the transmission band of said rotary transformer for the benefit of lowering the lower cut-off frequency thereof.

2. Method according to claim 1, wherein performance of recording at said maximum relative speed has a greater frequency bandwidth of signals for recording and is accomplished while said driver series resistance and said recording amplifier terminating resistance provide a good power transfer impedance match and performance of recording at every said lower relative speed has a lower frequency bandwidth of signals for recording and is accomplished while the value of one of said driver series resistance and said recording amplifier input terminating resistance is reduced.

3. Apparatus for recording data on oblique tracks on a magnetic tape with at least one recording head mounted on a head wheel for scanning said tape during recording, said apparatus comprising means for advancing said tape past said head wheel, means for simultaneously controlling and varying the speed of tape advance provided by said tape advancing means and the speed of rotation of said head wheel for providing effective scanning of said tape and thereby setting different relative speeds of the head wheel with respect to said tape, a recording amplifier (10) on said head wheel having its output connected to said recording head, a rotary transformer (12) having a rotor winding (14) connected to the input of said recording amplifier (10), input termination resistance means (13) being provided on said head wheel for said input of said recording amplifier, said rotary transformer having a stator winding (11), a driver amplifier (17) having an output connected to said stator winding of said transformer (12) through an interposed resistance presenting an internal generator resistance for said driver amplifier considered as a generator of signals, said driver amplifier having an input connected to a source of data signals for recording, said apparatus further comprising:

means connected to said means for varying said relative speed of said recording head with respect to said tape on which recording is performed for producing a relative speed signal;

and means for reducing the resistance interposed between the output of said driving amplifier and said stator winding (14) of said rotary transformer from a maximum value of said resistance whenever said relative speed signal differs from a value substantially representing a maximum relative speed, by causing said said reducing means to produce greater reductions of said interposed resistance for greater differences of said relative speed signal from its said value representing a maximum relative speed.

4. Apparatus according to claim 3, wherein said means for lowering the value of said interposed resistance includes switching means for stepwise reduction of said interposed resistance.

* * * * *